(12) United States Patent
Lisk et al.

(10) Patent No.: US 7,472,573 B2
(45) Date of Patent: Jan. 6, 2009

(54) TOOLING ASSEMBLY

(76) Inventors: Rodger A. Lisk, 20929 Carlysle, Dearborn, MI (US) 48124; Manny William Peraza, 27594 W. Huron River Dr., Flat Rock, MI (US) 48134

(*) Notice: Subject to any disclaimer, the term of this patent is extended or adjusted under 35 U.S.C. 154(b) by 0 days.

(21) Appl. No.: 12/075,533

(22) Filed: Mar. 12, 2008

(65) Prior Publication Data

US 2008/0156156 A1 Jul. 3, 2008

Related U.S. Application Data

(63) Continuation of application No. 10/764,318, filed on Jan. 23, 2004, now Pat. No. 7,350,387.

(51) Int. Cl.
*B21D 13/00* (2006.01)
*B21B 23/00* (2006.01)
*B26F 1/24* (2006.01)

(52) U.S. Cl. .............................. 72/186; 72/366.2; 83/30
(58) Field of Classification Search .................. 72/186, 72/187, 196, 462, 326, 366.2; 83/30, 452.3, 83/454.4, 500–503, 508.3; 241/236, 295
See application file for complete search history.

(56) References Cited

U.S. PATENT DOCUMENTS

| | | | | | |
|---|---|---|---|---|---|
| 3,501,280 | A | * | 3/1970 | Myers | 51/298 |
| 3,766,808 | A | * | 10/1973 | Cremisio et al. | 76/112 |
| 5,423,240 | A | * | 6/1995 | DeTorre | 83/500 |
| 5,682,784 | A | * | 11/1997 | Stoynoff, Jr. | 72/186 |

* cited by examiner

*Primary Examiner*—Derris H Banks
*Assistant Examiner*—Teresa Bonk
(74) *Attorney, Agent, or Firm*—Brooks Kushman P.C.

(57) ABSTRACT

A tooling assembly 10 having a first set of blades which are formed from a first material and a second set of blades which are formed from a second material and which may be used to perform a cutting operation.

5 Claims, 2 Drawing Sheets

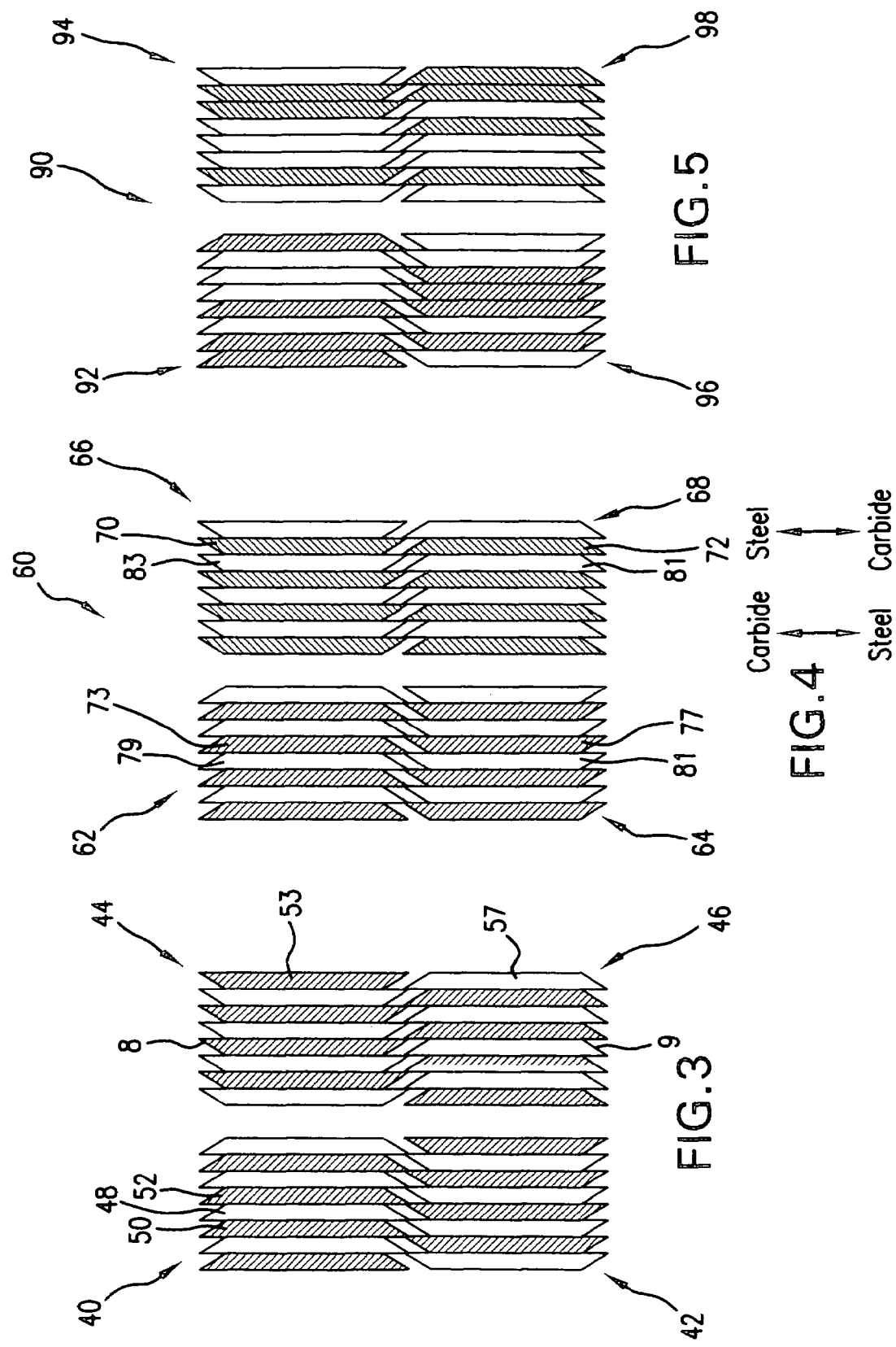

TOOLING ASSEMBLY

CROSS-REFERENCE TO RELATED APPLICATION

This is a continuation of nonprovisional application Ser. No. 10/764,318 filed on Jan. 23, 2004 now U.S. Pat. No. 7,350,387.

FIELD OF THE INVENTION

The present invention generally relates to a tooling assembly and more particularly, to a form roll tooling assembly which is used to selectively cut and/or slit sheet type material in a desired manner.

BACKGROUND OF THE INVENTION

A form roll tooling assembly selectively cuts and/or slits a sheet of material in order to allow the material to be used in the manufacture of a heat exchanger, such as but not limited to a radiator, heat core, evaporator, and/or condenser. Particularly, the formed cuts or slits promote and direct the flow of air through the formed exchanger. While current roll tooling assemblies do allow for the formation of cuts and/or slits within a sheet of material, they suffer from some drawbacks.

That is, such a roll tooling assembly typically utilizes steel blades which cooperatively and meltingly form the desired cuts and/or slits within the received material. Such blades become dull within a relatively short period of time, thereby requiring frequent maintenance and/or replacement and undesirably and frequently disrupting the overall forming process. Hence, costs are incurred in maintaining the tooling assembly and in the frequent "maintenance downtime" associated with this type of tooling assembly. Moreover, these steel blades tend to "flex" or move over time, thereby increasing the likelihood of the entry of dust and/or other ambient type particulates (e.g., such as that which is created during the roll forming process) between the blades. The entry of such foreign matter causes the blades to expand and/or move in separation (i.e., dust or other particulates resultant from the forming process becomes "built-up" over time, thereby forcing the blades to move away from or separate from the other blades) and impairs their operative mating arrangement, thereby further causing increased wear and the creation of items which have undesirably positioned slits or openings.

To overcome the foregoing disadvantages, use has been made of blades which are formed from a carbide material. Particularly, a carbide blade is more rigid than a steel blade. Hence, the carbide blades have a higher "flex resistance". Moreover, a carbide blade is less resistant to wear than a steel blade and has been shown to operate from about twenty to about one-hundred times as long as a steel blade, before it must be replaced or sharpened.

While a carbide blade has many superior benefits to a steel blade, it also has many serious drawbacks. By way of example and without limitation, a carbide blade easily shatters or becomes damaged due to its brittleness. Hence, vibration or other forces, such as and without limitation, material "jam-ups" (e.g., a material "jam-up" hereinafter refers to the material which the blades are forming being caught around or wedged around the blades, thereby forcing the blades to form two layers of material rather than one layer of material), acting upon the blade in a manufacturing environment, oftentimes cause the blade to be destroyed or damaged. Further, the relatively high cost of a carbide blade has made this alternative unpalatable.

There is therefore a need for a new and improved roll forming tooling assembly which overcomes some or all of the previously delineated disadvantages of prior roll forming tooling assemblies.

SUMMARY OF THE INVENTION

It is a first non-limiting object of the present invention to provide a tooling assembly which overcomes some or all of the previously delineated disadvantages of prior tooling assemblies.

It is a second non-limiting object of the present invention to provide a roll forming tooling assembly which overcomes some or all of the previously delineated disadvantages of prior tooling assemblies and which further includes at least a pair of dissimilar blades.

It is a first non-limiting feature of the present invention to provide a tooling assembly. Particularly, the provided tooling assembly includes at least a first blade which is formed from a first material; and at least a second blade which is formed from a second material.

It is a second non-limiting feature of the present invention to provide a tooling assembly. Particularly, the tooling assembly includes at least a first blade having a cutting surface which is formed from a first material; and at least a second blade having a cutting surface which is formed from a second material.

According to a third non-limiting feature of the present invention, a tooling assembly is provided. Particularly, the tooling assembly includes a first plurality of blades which are each formed from a first material; and a second plurality of blades which are each formed from a second material and wherein each of said first plurality of blades is operatively placed between a unique pair of said second plurality of blades.

According to a fourth non-limiting feature of the present invention, a tooling assembly is provided. Particularly, the tooling assembly includes a first plurality of blades which are formed from a first material and which are operatively and randomly deployed within said tooling assembly; and a second plurality of blades which are formed from a second material and which are operatively and randomly deployed within said tooling assembly.

These and other features, aspects, and advantages of the present invention will become apparent from a reading of the following detailed description of the preferred embodiment of the invention and by reference to the following drawings.

BRIEF DESCRIPTION OF THE DRAWINGS

FIG. 3 is a front sectional view of a roll forming tooling assembly which is made in accordance with the teachings of an alternate embodiment of the invention;

FIG. 4 is a front sectional view of a roll forming tooling assembly which is made in accordance with the teachings of another alternate embodiment of the invention;

FIG. 5 is a front sectional view of a roll forming tooling assembly which is made in accordance with the teachings of yet another alternate embodiment of the invention.

DETAILED DESCRIPTION OF THE PREFERRED EMBODIMENT OF THE INVENTION

Figure 1:
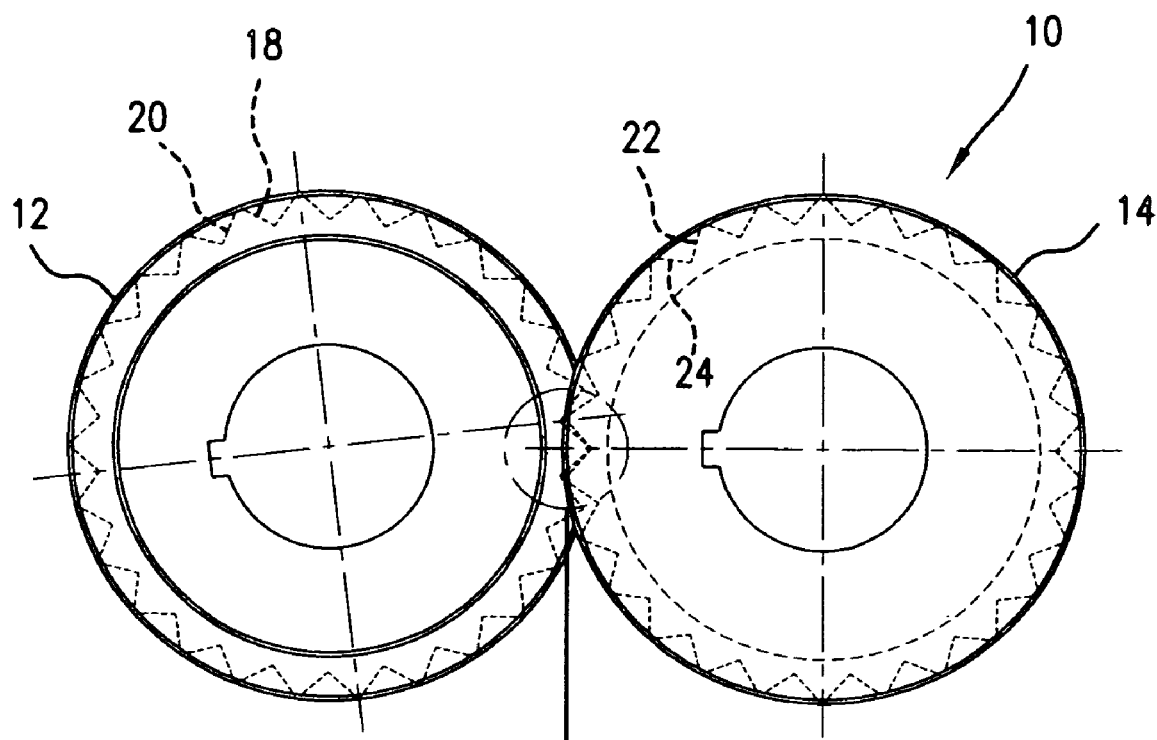
FIG. 1 is a side sectional view of a roll forming tooling assembly which is made in accordance with the teachings of the preferred embodiment of the invention.
Figure 2:
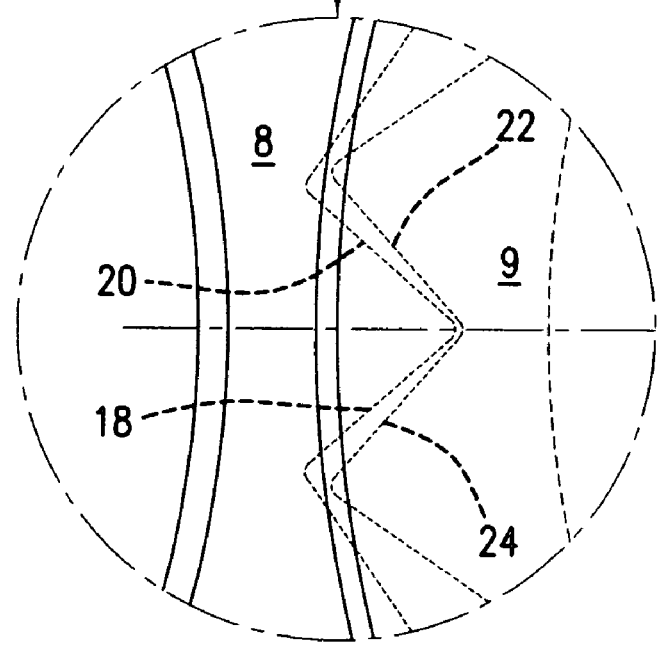
FIG. 2 is an exploded view of a portion of the roll forming tooling assembly which is shown in FIG. 1.

Referring now to FIGS. 1 and 2, there is shown a side view of a roll forming tool assembly 10 which is made in accordance with the teachings of the preferred embodiment of the invention.

Particularly, the roll forming tool assembly 10 includes a first selectively rotatable member 12 and a second selectively rotatable member 14. As shown, selectively rotatable member 12 includes several blades, each blade includes multiple louver cutting edges, such as louver edges 18, 20, while selectively rotatable member 14 includes several cutting edges, such as edges 22, 24. In the most preferred embodiment of the invention, the blade 9 is made from a first material, such as steel, while blade 8 is made from a second material, such as carbide. Hence, each blade, such as blade 8, which is made from the second material and which is disposed upon the selectively rotatable member 12 is operatively positioned between two blades which are formed from the first material. Further, as shown, each blade, such as blade 9, which is made from the second material and which is disposed upon the selectively rotatable member 14, is operatively positioned between two blades which are formed from the first material.

In this manner, as best shown in FIG. 2, a blade, such as blade 9, which is formed from the first material and which is operatively disposed upon or which is integrally formed with the first selectively rotatable member 14, engages a blade, such as blade 8, which is formed from the second material and which is operatively positioned upon the selectively rotatable member 12. The selective engagement of blades which are formed from such dissimilar materials (e.g. steel and carbide) reduces flex while protecting the carbide blades. Further, the carbide blades reduce the wear associated with steel blades.

In a first alternate embodiment of the invention, as best shown in FIG. 3, four rotatable members 40, 42, 44, and 46 are employed to provide cuts or slits within a received sheet of material. Particularly, each of the members 40, 42, 44, and 46 includes an alternating blade arrangement. That is, each blade, such as blade 48, which is formed from steel is operatively positioned between two blades, such as blades 50, 52 which are formed from carbide and each carbide blade, such as blade 50, of the member 40 engages a unique one of the carbide blades of the member 42. Similarly, each carbide blade of the member 44 engages a unique one of the carbide blades of the member 46.

Referring now to FIG. 4, there is shown a tooling assembly 60 which is made in accordance with the teachings of yet another alternate embodiment of the invention. Particularly, tooling assembly 60 includes rotatable members 62, 64, 66, and 68 and each of the members 62-68 includes steel blades, such as blade 83, and carbide blades, such as blade 70. More particularly, each carbide blade of each member 62-68 is operatively disposed between two steel blades. Further, each carbide blade of member 62 selectively engages a unique one of the steel blades of the member 64 and each steel blade of the member 62 engages a unique one of the carbide blades of the member 64. Further, each carbide blade of member 66 selectively engages a unique one of the steel blades of the member 68 and each steel blade of member 66 selectively engages a unique one of the carbide blades of the member 68, such as blade 70.

Referring now to FIG. 5, there is shown a tooling assembly 90 which is made in accordance with the teachings of yet another alternate embodiment of the invention. Particularly, the tooling assembly 90 includes rotatable members 92, 94, 96, and 98 and each of the members 92-98 respectively include a plurality of carbide blades and a plurality of steel blades which are respectively and randomly distributed in these members.

It should be appreciated that each respective member, 40-46, 62-68, and 92-98 may include any number of blades and, these blades may comprise only one type of material (i.e., only carbide or only steel), may comprise substantially only one material, such as and without limitation, steel but include at least one blade having another material, such as and without limitation, carbide. For example and without limitation, member 40 may comprise substantially all steel blades, but employ at least one carbide blade.

In this manner, as should be understood by one who is skilled in the relevant art, the inclusion of at least one carbide blade upon each respective rotatable member 40-46, 62-68, and 92-98 allows the carbide blade(s) to perform the cutting or forming application for which it was employed even if its respective cutting blade (i.e., cutting blade hereinafter refers to a blade which is paired with and opposite of the at least one carbide blade on its respective rotatable member 40-46, 62-68, and 92-98) is substantially dull or broken. That is, due to the relative flex resistant nature of a carbide blade, a carbide blade need only be paired with a respective cutting blade having only one substantially flat edge. In this manner, the substantially flat edge of the respective cutting blade which is paired with the carbide blade, allows the carbide blade to slidably and frictionally engage the flat edge, thereby performing the forming or cutting job for which both respective blades were employed.

It is to be understood that the invention is not limited to the exact construction or methodology which has been delineated above, but that various changes and modifications may be made without departing from the spirit and the scope of the inventions as are further delineated in the following claims.

What is claimed is:

1. A method for cutting material comprising the steps of providing;

a first rotatable member having a first blade which is comprised of only carbide, a second blade which is comprised of only steel, and a third blade which is comprised only of steel, wherein said second and third blades are respectively and operatively disposed at opposite sides of said first blade, thereby causing said second blade to be operatively positioned between said third blade and said first blade;

a second rotatable member having a fourth blade which comprised only of carbide, a fifth blade which is comprised of only steel, and a sixth blade which is comprised only of steel, wherein said fifth and sixth blades are respectively and operatively disposed at opposite sides of said fourth blade, thereby causing said fourth blade to be operatively positioned between said fifth blade and said sixth blade;

wherein said first blade is constrained to selectively and cuttingly engage only said fourth blade, wherein said second blade is constrained to cuttingly engage only said fifth blade; and wherein said third blade is constrained to only cuttingly engage said sixth blade, thereby causing said tooling assembly to operatively and selectively cutting said material.

2. The tooling method of claim 1 wherein said first blade and said fourth blade are substantially the same size and shape.

3. The tooling method of claim 1, wherein said third blade and said sixth blade are substantially the same size and shape.

4. The tooling method of claim 1, wherein said second and said fifth blade are substantially the same size and shape.

5. The tooling method of claim 1, wherein said first rotatable member and said second rotatable member contain substantial the same number of steel blades, and substantially the same number of carbide blades.

\* \* \* \* \*